United States Patent [19]

Rosenau et al.

[11] Patent Number: 5,821,302
[45] Date of Patent: *Oct. 13, 1998

[54] SHAPED ARTICLES COMPRISING THERMOPLASTIC MOLDING MATERIALS

[75] Inventors: Bernhard Rosenau; Graham Edmund Mc Kee, both of Neustadt; Christian Schweiger, Mannheim, all of Germany

[73] Assignee: BASF Aktiengesellschaft, Ludwigshafen, Germany

[*] Notice: The term of this patent shall not extend beyond the expiration date of Pat. No. 5,631,323.

[21] Appl. No.: 721,544

[22] Filed: Sep. 26, 1996

[30] Foreign Application Priority Data

Oct. 4, 1995 [DE] Germany .................. 195 36 892.4

[51] Int. Cl.⁶ .................................................. C08L 51/06
[52] U.S. Cl. ........................ 525/80; 525/70; 525/78; 525/83; 525/85; 525/86
[58] Field of Search .................... 525/80, 83, 85, 525/86, 70, 78

[56] References Cited

U.S. PATENT DOCUMENTS

| | | | |
|---|---|---|---|
| 4,224,419 | 9/1980 | Swoboda et al. | 525/71 |
| 4,393,172 | 7/1983 | Lindner et al. | 525/80 |
| 4,634,734 | 1/1987 | Hambrecht et al. | 525/85 |
| 4,788,253 | 11/1988 | Hambrecht et al. | 525/83 |
| 4,800,216 | 1/1989 | Eichenauer et al. | 525/74 |
| 5,120,788 | 6/1992 | Seitz et al. | 525/80 |
| 5,196,480 | 3/1993 | Seitz et al. | 525/71 |
| 5,336,718 | 8/1994 | Niessner | 525/77 |
| 5,342,898 | 8/1994 | Seitz et al. | 525/281 |
| 5,393,836 | 2/1995 | Niessner et al. | 525/67 |
| 5,475,053 | 12/1995 | Niessner et al. | 525/64 |
| 5,475,055 | 12/1995 | Deckers et al. | 525/77 |
| 5,492,966 | 2/1996 | Kidder | 525/86 |
| 5,576,385 | 11/1996 | Tierensee et al. | 525/77 |
| 5,631,323 | 5/1997 | Guntherberg | 525/71 |

FOREIGN PATENT DOCUMENTS

| | | |
|---|---|---|
| 326 024 | 8/1989 | European Pat. Off. . |
| 520 813 | 12/1992 | European Pat. Off. . |
| 603 674 | 6/1994 | European Pat. Off. . |
| 716 101 | 12/1995 | European Pat. Off. . |
| 29 01 576 | 1/1979 | Germany . |
| 42 11 412 | 10/1993 | Germany . |
| 44 04 750 | 2/1994 | Germany . |

OTHER PUBLICATIONS

Kunstoffe im Automobilbau, Weber, 93 (1991), pp. 138–146.

*Primary Examiner*—Fred Zitomer
*Attorney, Agent, or Firm*—Keil & Weinkauf

[57] ABSTRACT

Shaped articles produced from thermoplastic molding materials which contain

A) from 30 to 99.8% by weight of a thermoplastic styrene polymer of

B) from 0.1 to 70% by weight of a graft polymer having an average particle diameter $d_{50}$ of less than 300 $\mu m$ C) from 0.1 to 70% by weight of a particulate polymer as a dulling agent.

7 Claims, No Drawings

SHAPED ARTICLES COMPRISING THERMOPLASTIC MOLDING MATERIALS

The present invention relates to shaped articles produced from thermoplastic molding materials which contain A) from 30 to 99.8% by weight of a thermoplastic polymer of a1) from 50 to 100% by weight of a styrene compound of the general formula

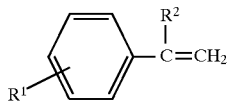

where $R^1$ and $R^2$ are each hydrogen or $C_1$—$C_8$-alkyl, or of a $C_1$—$C_8$-alkyl ester of acrylic acid or methacrylic acid, or mixtures thereof, a2) from 0 to 40% by weight of acrylonitrile or methacrylonitrile, or mixtures thereof, and a3) from 0 to 40% by weight of one or more further monoethylenically unsaturated monomers which differ from a2), B) from 0.1 to 70% by weight of a graft polymer having an average particle diameter $d_{50}$ of less than 700 nm and comprising b1) from 30 to 90% by weight of an elastomeric graft core comprising a polymer having a glass transition temperature below 0° C., obtainable by copolymerization of b11) from 50 to 99.99% by weight of a $C_1$—$C_{10}$-alkyl ester of acrylic acid, b12) from 0.01 to 5% by weight of a polyfunctional, crosslinking monomer, and b13) from 0 to 40% by weight of one or more further monoethylenically unsaturated monomers which differ from b11), and b2) from 10 to 70% by weight of a graft shell comprising b21) from 50 to 100% by weight of a styrene compound of the general formula

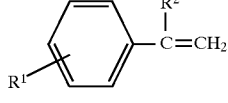

where $R^1$ and $R^2$ are each hydrogen or $C_1$—$C_8$-alkyl, or of a $C_1$—$C_8$-alkyl ester of acrylic acid or methacrylic acid, or mixtures thereof, b22) from 0 to 40% by weight of acrylonitrile or methacrylonitrile, or mixtures thereof, and b23) from 0 to 40% by weight of one or more further monoethylenically unsaturated monomers and C) from 0.1 to 70% by weight of a particulate polymer as a dulling agent, the particulate polymer C) being essentially composed of c1) an elastomeric graft polymer having an average particle diameter $d_{50}$ of 700 nm or more, which essentially contains a graft core based on butadiene and a graft shell based on styrene and acrylonitrile and is prepared by the solution polymerization method, or c2) a hard polymer based on polyalkyl methacrylates, or c3) a polymer which is incompatible or partially compatible with mixtures which contain the components A) and B) defined above, or c4) a graft polymer as defined under B), but having an average particle diameter $d_{50}$ of 700 nm or more.

For the purposes of the present invention, the term shaped articles includes semifinished products and films.

The present invention furthermore relates to shaped articles containing special particulate polymers C) and the use of the shaped articles for exterior applications, in particular for motor vehicles.

Shaped articles comprising plastics have a wide range of applications since even complex geometries can be realized from plastics by technically matured methods, such as injection molding. Owing to the possibility of shaping eyes, snap hooks, film hinges and other details, easy-to-mount shaped articles are obtainable in one operation, and such shaped articles, in particular those comprising toughened molding materials, are increasingly being used in the construction sector, for example in automotive construction, as a cost-effective and weight-saving alternative to metal parts. The publication Kunststoffe im Automobilbau by A. Weber, Automobiltechnische Zeitschrift 93 (1991) 3, 138–146, mentions, as further advantages of automotive plastics, in particular the parameters strength, rigidity and toughness, which are variable within wide limits, and the weather resistance.

Especially when plastics are used outdoors, sufficient resistance to weather effects, in particular UV radiation, freezing temperatures, temperature change and water, must be ensured. With polymers of conjugated dienes, for example polybutadiene rubber, toughened molding materials are therefore not very suitable for outdoor applications in spite of their good low-temperature impact strength, since the C=C double bonds which have remained in the rubber molecules are attacked by UV radiation, resulting in weathering of the surface, visible as graying or yellowing, and aging, detectable from a deterioration in the mechanical properties.

These phenomena can be reduced, but not completely suppressed, by the presence of UV stabilizers in the molding materials.

Better weather resistance of impact-resistant shaped articles is achieved if their molding materials contain rubber polymers without double bonds in the molecules. Frequently, such shaped articles consist of ASA molding materials (acrylonitrile/styrene/acrylate) and accordingly contain poly(alkyl acrylate) as the rubber.

In certain applications of weather-resistant, impact-resistant polymer materials, such as ASA, in particular in automotive construction, a dazzle-free, dull surface is increasingly desired for decorative reasons or from safety points of view, for example reduced dazzling of the driver by reflection, and improved performance characteristics—fingerprints are scarcely visible on dull surfaces.

Dull shaped articles can be obtained by treating the surface of the finished, normally glossy shaped article, for example by mechanical roughening, such as grinding and brushing, by etching, superficial dissolution and swelling or by application of a dull coat (coating). However, the disadvantage of an additional operation on the finished shaped article is common to all processes.

Furthermore, compression molds and molds having a structured surface may be used for the production of shaped articles having a dull surface, but the structure of the mold is relatively rapidly worn away.

The addition of inorganic dulling agents, such as silica gel or chalk, to polymers has the disadvantage that the mechanical properties of the molding are adversely affected and the extrusion dies, compression molds and molds are considerably more rapidly worn owing to the great abrasiveness and hardness of the inorganic dulling agents. Particularly when structured mold surfaces and such agents are simultaneously used for achieving a particularly strong dulling effect, the mold surfaces wear away rapidly and the surface of the shaped article therefore has glossy areas.

This adverse effect can be avoided by the addition of suitable organic dulling agents. They consist of particles of comparatively large diameter (D>about 0.7 μm), which are dispersed in the matrix polymer. The particles project slightly from the smooth and hence glossy surface of the matrix polymer—a microscopically rough surface is formed—and thus result in diffuse reflection of the incident light (scattering), causing the surface to appear dull to the observer.

According to EP-A 576 960, another method for achieving dull, impact-resistant molding materials is to produce larger particles by agglomerating small particles of those graft polymers which contain acidic groups in the graft core and basic groups in the graft shell. Such particles are described in EP-A 450 511. However, the dulling effect to be achieved by these particles is subject to limits in some cases.

It is an object of the present invention to provide shaped articles which are weather-resistant and have a dull surface and furthermore have high impact strength.

We have found that this object is achieved by the shaped articles defined in the outset. We have also found shaped articles which contain certain particulate polymers C). Finally, we have found the use of the shaped articles for the exterior of motor vehicles.

The component A) of the molding materials of which the novel shaped articles consist is present in the materials in an amount of from 30 to 99.8, preferably from 35 to 95, particularly preferably from 40 to 90%, by weight, based on the sum of the components A), B) and C).

The component A) is obtained by polymerization of a monomer mixture comprising, based on A), a1) from 50 to 100, preferably from 60 to 95, particularly preferably from 60 to 90, % by weight of a styrene compound of the general formula I

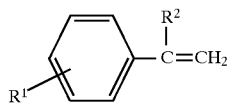

where $R^1$ and $R^2$ are each hydrogen or $C_1$—$C_8$-alkyl, or of a $C_1$—$C_8$-alkyl ester of acrylic acid or methacrylic acid, or mixtures thereof, a2) from 0 to 40, preferably from 5 to 38, % by weight of acrylonitrile or methacrylonitrile, or mixtures thereof, and a3) from 0 to 40, preferably from 0 to 30, % by weight of further monoethylenically unsaturated monomers differing from a2).

Styrene, α-methylstyrene and furthermore styrenes alkylated in the nucleus with $C_1$—$C_8$-alkyl such as p-methylstyrene or tert-butylstyrene, are preferably used as the styrene compound. Styrene is particularly preferred.

$C_1$—$C_8$-Alkyl esters of acrylic acid or methacrylic acid, or mixtures thereof, particularly those which are derived from methanol, ethanol, n-propanol, isopropanol, sec-butanol, tert-butanol, isobutanol, pentanol, hexanol, heptanol, octanol and 2-ethylhexanol and especially n-butanol, are suitable instead of the styrene compounds or as a mixture with them. Methyl methacrylate is particularly preferred.

Furthermore, the component A) may contain, at the expense of the monomers a1) and a2), one or more further, monoethylenically unsaturated monomers a3) which vary the mechanical and thermal properties of A) within a certain range. Examples of such comonomers are:

N-substituted maleimides, such as N-methyl-, N-phenyl- and N-cyclohexylmaleimide;

acrylic acid, methacrylic acid, and furthermore dicarboxylic acids, such as maleic acid, fumaric acid and itaconic acid, and the anhydrides thereof, such as maleic anhydride;

monomers having nitrogen functional groups, such as dimethylaminoethyl acrylate, diethylaminoethyl acrylate, vinylimidazole, vinylpyrrolidone, vinylcaprolactam, vinylcarbazole, vinylaniline, acrylamide and methacrylamide;

aromatic and araliphatic esters of acrylic acid and methacrylic acid, such as phenyl acrylate, phenylmethyl acrylate, benzyl acrylate, benzyl methacrylate, 2-phenylethyl acrylate, 2-phenylethyl methacrylate, 2-phenoxyethyl acrylate and 2-phenoxyethylmethacrylate;

unsaturated ethers, such as vinyl methyl ether, and mixtures of these monomers.

Examples of preferred components A) are:

A/1: Polymethyl methacrylate (PMMA)—in this case A) is obtainable by polymerization of 100% by weight of methyl methacrylate (component a1), A/2: Polymers obtainable by polymerization of from 70 to 99, preferably from 90 to 99, % by weight of methyl methacrylate and from 1 to 30, preferably from 1 to 10, % by weight of styrene, where some or all of the styrene may be replaced by $C_2$—$C_8$-alkyl esters of acrylic acid or methacrylic acid, A/3: Polymers obtainable by copolymerization of from 40 to 90, preferably from 50 to 80, % by weight of styrene or α-methylstyrene, or mixtures thereof, a1), with from 10 to 60, preferably from 20 to 40, % by weight of acrylonitrile a2) and, if required, from 0 to 30, preferably from 0 to 20, % by weight of further monoethylenically unsaturated monomers a3) differing from a2).

If the component A) preferably contains styrene and acrylonitrile, the known commercial SAN copolymers are formed. They have, as a rule, a viscosity number VN (determined according to DIN 53 726 at 25° C. in a 0.5% strength by weight solution in dimethylformamide) of from 40 to 160 ml/g, corresponding to an average molecular weight of from about 40,000 to 200,000.

The component A) can be obtained in a manner known per se, for example by mass, solution, suspension, precipitation or emulsion polymerization. Details of these processes are described, for example, in Kunststoffhandbuch, editors Vieweg and Daumiller, Carl-Hanser-Verlag Munich, Vol. 1 (1973), pages 37 to 42 and Vol. 5 (1969), pages 118 to 130, and in Ullmanns Encyklopädie der technischen Chemie, 4th edition, Verlag Chemie Weinheim, Vol. 19, pages 107 to 158, Polymerisationstechnik.

The component B) of the molding material of which the novel shaped articles consist is present in the materials in an amount of from 0.1 to 70, preferably from 5 to 60, particularly preferably from 10 to 55, % by weight, based on the sum of the components A), B) and C). This component is a particulate graft copolymer which has an average particle diameter $d_{50}$ of less than 700 nm and is composed of an elastomeric graft core b1) comprising a polymer having a glass transition temperature below 0° C. (soft component) and a shell b2) (hard component) grafted thereon.

The graft core b1) is present in an amount of from 30 to 90, preferably from 35 to 80, particularly preferably from 40 to 70, % by weight, based on the component B).

The graft core b1) is obtained by polymerization of a monomer mixture comprising, based on b1), b11) from 50 to 99.99, preferably from 80 to 99.7, particularly preferably from 85 to 99, % by weight of a $C_1$—$C_{10}$-alkyl ester of acrylic acid, b12) from 0.01 to 20, preferably 0.3 to 10, particularly preferably from 1 to 5, % by weight of a polyfunctional crosslinking monomer and b13) from 0 to 20, preferably from 0 to 5, % by weight of further monoethylenically unsaturated monomers differing from b11).

Suitable alkyl acrylates b11) are especially those which are derived from ethanol, from 2-ethylhexanol and in particular from n-butanol.

Crosslinking monomers b12) are bi-or polyfunctional comonomers, for example butadiene and isoprene, divinyl esters of dicarboxylic acids, such as of succinic acid and adipic acid, diallyl and divinyl ethers of bifunctional alcohols such as of ethylene glycol and of butane-1,4-diols, diesters of acrylic acid and methacrylic acid with the stated bifunctional alcohols, 1,4-divinyl-benzene and triallyl cyanurate. Particularly preferred are the acrylates of tricyclodecenyl alcohol of the formula

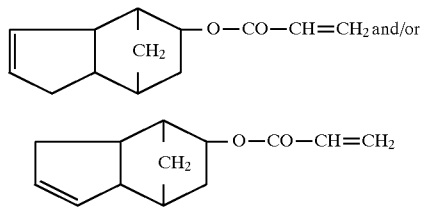

which is known by the name dihydrodicyclopentadienyl acrylate, and the allyl esters of acrylic acid and of methacrylic acid.

The further monoethylenically unsaturated monomers b13) which may be present in the graft core b1) at the expense of the monomers b11) and b12) are, for example, vinylaromatic monomers, such as styrene, styrene derivatives of the general formula

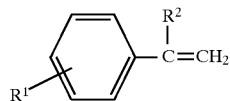

where $R^1$ and $R^2$ are each hydrogen or $C_1$—$C_8$-alkyl;

acrylonitrile, methacrylonitrile;

$C_1$—$C_4$-alkyl esters of acrylic acid, such as methyl acrylate, ethyl acrylate, n-propyl acrylate, isopropyl acrylate, n-butyl acrylate, isobutyl acrylate, sec-butyl acrylate, tert-butyl acrylate, ethylhexyl acrylate and the corresponding esters of methacrylic acid; furthermore the glycidyl esters, glycidyl acrylate and methacrylate;

moreover the monomers stated for the component a3);

and mixtures of these monomers.

Preferred monomers b13) are styrene, acrylonitrile, methyl methacrylate, glycidyl acrylate and methacrylate, acrylamide and methacrylamide.

The glass transition temperature of the graft core b1) is determined by the DSC method, as described in the publication H. Illers, Makromol. Chemie 127 (1969), 1 et seq.

The graft shell b2) is obtained by polymerization of a monomer mixture comprising, based on b2), b21) from 50 to 100, preferably from 60 to 95, particularly preferably from 60 to 90, % by weight of monomers as described for a1), b22) from 0 to 40, preferably from 0 to 30, % by weight of acrylonitrile or methacrylonitrile, or mixtures thereof, and b23) from 0 to 40, preferably from 0 to 20, % by weight of monomers as described for b13).

Accordingly, the graft shell b2) may contain further monomers b22) or b23), or mixtures thereof, at the expense of the monomers b21). The graft shell b2) is preferably composed of polymers such as those which were stated as being preferred embodiments A/1, A/2 and A/3 of the component A).

The graft polymers B) are obtainable in a manner known per se, preferably by emulsion polymerization at from 30° to 80° C. For example, alkali metal salts of alkanesulfonic or alkylarylsulfonic acids, alkylsulfates, fatty alcohol sulfonates, salts of higher fatty acids of 10 to 30 carbon atoms, sulfosuccinates, ether sulfonates or resin soaps are suitable as emulsifiers for this purpose. The alkali metal salts of alkanesulfonates or fatty acids of 10 to 18 carbon atoms are preferably used.

The amount of water preferably used for the preparation of the dispersion is such that the finished dispersion has a solids content of from 20 to 50 % by weight.

Preferred polymerization initiators are free radical formers, for example peroxides, preferably peroxosulfates, and azo compounds, such as azobisisobutyronitrile. However, redox systems, particularly those based on hydroperoxides, such as cumyl hydroperoxide, may also be used. Molecular weight regulators, eg. ethylhexyl thioglycolate, tert-dodecyl mercaptan, terpinols and dimeric α-methylstyrene, may also be present.

Buffer substances, such as $Na_2HPO_4NaH_2PO_4$ or sodium bicarbonate, may be concomitantly used for maintaining a constant pH, which is preferably from 6 to 9.

Emulsifiers, initiators, regulators and buffer substances are used in the conventional amounts, so that further information in this context is unnecessary.

The graft core can particularly preferably also be prepared by polymerization of the monomers b1) in the presence of a finely divided rubber latex (ie. seed latex polymerization method).

In principle, it is also possible to prepare the grafting base by a method other than that of emulsion polymerization, for example by mass, suspension or solution polymerization, and subsequently to emulsify the polymers obtained. Microsuspension polymerization is also suitable, oil-soluble initiators, such as lauryl peroxide and tert-butyl perpivalate, preferably being used. The relevant methods are known.

The reaction conditions are preferably matched with one another in a manner known per se, so that the polymer particles have a very uniform diameter $d_{50}$ of from 60 to 700 nm, in particular from 80 to 650 nm.

Instead of a uniform graft polymer B), different polymers from among these polymers, especially those having substantially different particle sizes, may also be used for the production of the novel shaped articles. Such mixtures having a bimodal size distribution have advantages with regard to process engineering during further processing. Suitable particle diameters are from 60 to 200 nm on the one hand and from 300 to 700 nm on the other hand.

Graft polymers having a plurality of soft and hard stages, for example of the structure b1)-b2)-b1)-b2) or b2)-b1)-b2), are also suitable, especially in the case of relatively large particles.

Preferably, relatively large graft particles B) can also be prepared by a two-stage process, as described, for example, in DE-A 24 27 960, Example 3, columns 9 and 10. A small-particled graft polymer is then first prepared in the usual manner by emulsion polymerization, after which the polymer obtained is agglomerated to give particles of larger diameter by adding an agglomerating agent.

If the grafting results in ungrafted polymers being formed from the monomers b2), these amounts, which as a rule are less than 10 % by weight of b2), are assigned to the mass of the component B).

The component B) is elastomeric and serves for toughening the hard matrix polymer A). If, for example, the matrix A) consists of a polymer based on styrene/acrylonitrile, ie. SAN polymer (preferred component A/3), and the graft polymer B) consists of an alkyl acrylate graft core b1) and a graft shell b2) based on styrene/acrylonitrile, the molding materials known to a person skilled in the art as ASA (acrylonitrile/styrene/acrylate) are thus obtained.

Polymers having a composition described for the component B) may furthermore have a dulling effect in addition to the toughening effect. This is the case when the average diameter $d_{50}$ of the graft particles is greater than about 700 nm, ie. sufficiently large for the projecting particles to impart microscopic roughness to the surface of the shaped article and for said surface therefore to appear dull to the observer, as described at the outset. Such a component having a large average diameter (>700 nm), which, with the exception of the diameter, is covered by the definition of the small-particled graft polymer B) ($d_{50}$<700 nm), is assigned to the component C) and is described there as embodiment c4).

The component C) is present in the molding materials of which the novel shaped articles consist in an amount of from 0.1 to 70, preferably from 0.5 to 50, particularly preferably from 1 to 40, % by weight, based on the sum of the components A), B) and C). The component C) is a particulate polymer which is suitable for dulling molding materials containing A) and B).

The following polymers c1) to c5) are suitable as component C).

In an embodiment c1), graft polymers which have an average particle diameter $d_{50}$ of 700 nm or more and essentially contain a graft core based on butadiene and a graft shell based on styrene and acrylonitrile, ie. acrylonitrile/butadiene/styrene (ABS) polymers, and are prepared by the solution polymerization method are suitable. They are known to a person skilled in the art as solution ABS (SABS). Graft polymers consisting of solution ABS have, as a rule, an average particle diameter $d_{50}$ of from 700 to 20,000 nm, preferably from 1000 to 15,000 nm, ie. are substantially larger than ABS graft particles which are prepared by the emulsion polymerization method otherwise usually used or by other polymerization methods.

In contrast to suspension or emulsion polymerization, in the solution polymerization method both the monomers and the polymers formed therefrom are dissolved in the solvent chosen.

The preparation of the solution ABS is carried out, as a rule, similarly to the preparation of rubber-modified high impact polystyrene. In general, a polybutadiene rubber is dissolved in a mixture of monomeric styrene and monomeric acrylonitrile, and the resulting solution of polybutadiene in styrene/acrylonitrile is then polymerized.

The polymerization is usually carried out in two stages, the pre-polymerization being effected in a first reactor and the subsequent main polymerization in a downstream reactor.

The polymerization inhibitors used are the usual free radical formers stated in the case of B), but the redox systems likewise mentioned there may also be used. For example, molecular weight regulators mentioned in the case of B) may also be present.

The preparation is carried out, as a rule, either by the continuous solution method (both stages in solution) or batchwise by the mass/suspension method (first stage in the absence of a suspending agent, second stage in suspension).

Details are given, for example, in U.S. Pat. No. 4,362,850 and Ullmanns Encyclopedia of Technical Chemistry, Vol. A21, pages 644–647. In a further embodiment c2), the particulate polymers C) consist essentially of hard polyalkyl methacrylates crosslinked, as a rule, with polyfunctional molecules, in particular of polymethyl methacrylate (PMMA). The average diameter $d_{50}$ of these polyalkyl acrylate particles is usually from 0.8 to 50 μm, preferably from 1 to 40 μm. These polymers c2) are preferably prepared by the microsuspension polymerization method, in which the monomer mixture is dispersed in water in the presence of a protective colloid with thorough stirring, ie. with high shear force. Stirring elements which are operated at circumferential speeds of from 10 to 25 m/s or other dispersion elements are usually used for this purpose. Once the droplets have reached the desired size, the polymerization is carried out with moderate stirring at circumferential speeds of less 3 m/s, by the addition of a free radical initiator and, as a rule, at from 40° to 130° C.

Examples of suitable protective colloids are cellulose derivatives, such as carboxymethylcellulose and hydroxymethylcellulose, poly-N-vinylpyrrolidone, polyvinyl alcohol and polyethylene oxide, anionic polymers, such as polyacrylic acid, and cationic ones, such as poly-N-vinylimidazole, in concentrations of, preferably, from 0.02 to 1% by weight of the total mass of the dispersion.

Particularly good results are obtained if, in addition to the protective colloids, colloidal silica is concomitantly used in a concentration of, as a rule, from 0.2 to 5% by weight, based on the amount of the dispersion. Further details of this method, which is particularly successful when a water-soluble polymer of adipic acid and diethanolamine is used as the protective colloid, are given in U.S. Pat. No. 3,615,972.

In order to suppress, during the microsuspension polymerization, the simultaneous emulsion polymerization process in which particles which are substantially smaller and therefore unsuitable for dulling are formed, a water-soluble inhibitor which suppresses the emulsion polymerization is advantageously used. Effective compounds of this type are, for example, chromium(+6) compounds, such as potassium dichromate.

The microsuspension polymerization is preferably carried out at a pH of from 3 to 9.

The polymerization initiators used may be the oil-or monomer-soluble free radical formers known to a person skilled in the art, in particular peroxides and azo compounds, as stated for the preparation of the component B. Their amount is, as a rule, from 0.1 to 3% by weight, based on the total amount of the monomers used for the preparation of c2).

The polymerization of the monomers takes place at from 20° to 150° C., preferably from 40° to 130° C. The lower limits of these ranges correspond, as a rule, to the decomposition temperature of the initiator used. The amount of water is preferably from 40 to 70% by weight of the total amount of the dispersion.

Further preferred embodiments c3) are polymers which are incompatible or only partially compatible with mixtures which contain A) and B).

Incompatibility is understood as meaning immiscibility at the molecular level. A polymer is considered to be incompatible with another if, in the solid state, the molecules of the two polymers are not randomly distributed but form two phases in the solid state which are separated from one another by a sharp phase boundary. The concentration of one polymer increases abruptly from zero to 100%, and that of the other decreases from 100% to zero, along a vector intersecting the phase interface.

There are fluid transitions between compatibility and incompatibility. They are characterized by the fact that, although a phase boundary forms, it is ill-defined. There is mutual interpenetration of the two phases at the interface. Accordingly, the concentration of one polymer increases more or less rapidly from zero to 100% along a vector intersecting the phase boundary, and that of the other polymer decreases more or less rapidly from 100% to zero.

In this case, the term partial compatibility, as frequently occurs in industrially important polymers, is also used.

Examples of polymers which are incompatible with A) and B) are rubbers based on butadiene, in particular acrylonitrile/butadiene rubbers, ie. nitrile rubber.

For example, commercial nitrile rubbers which contain from 5 to 35, in particular from 15 to 30, % by weight of acrylonitrile (the remainder being butadiene) are suitable. These copolymers may be prepared by the emulsion or mass polymerization method. The Mooney viscosity according to ASTM D 1646-81 generally serves as a measure of the plasticity. Nitrile rubbers which are suitable according to the invention may have a Mooney viscosity of from 15 to 130, in particular from 30 to 100, measured at 100° C. The preparation of such rubbers in emulsion is described in U.S. Pat. No. 3,449,470. A description is also contained in German Patent 3,322,784.

Further examples of polymers incompatible with components A) and B) are copolymers of butadiene and acrylonitrile, in which the double bonds of the butadiene units were hydrogenated after the polymerization. Such polymers are described, for example, in U.S. Pat. No. 4,857,591 and in German Laid-Open Application DOS 3,329,974.

Further examples of polymers incompatible with components A) and B) are copolymers of 1) $C_2$—$C_{20}$-alkyl esters of acrylic acid or methacrylic acid,
2) acrylonitrile and/or methacrylonitrile,
3) styrene and its substituted derivatives and
4) further acrylic and methacrylic compounds, such as acrylic acid and methacrylic acid, and maleic anhydride and its derivatives, for example maleates and maleimides, such as alkyl-and arylmaleimides.

These polymers have, as a rule, no shell structure and a low gel content of, usually, less than 50% by weight. Their preparation is known to a person skilled in the art and is described in the literature, and further information is therefore unnecessary.

Examples of particularly preferred copolymers of the last-mentioned type are those of n-butyl acrylate, acrylonitrile and styrene and, if required, acrylic acid and/or methacrylic acid.

Examples of partially compatible polymers are the pairs polymethyl methacrylate/copolymer of styrene and acrylonitrile, polymethyl methacrylate/polyvinyl chloride and polyvinyl chloride/copolymer of styrene and acrylonitrile and the three-phase system polycarbonate/polybutadiene/copolymer of styrene and acrylonitrile (=polycarbonate/ABS).

Further details regarding the definition of the compatibility of polymers and in particular the solubility parameter as a quantitative measure are given, for example, in Polymer Handbook, editors J. Brandrup and E. H. Immergut, 3rd Edition, Wiley, New York 1989, pages VII/519 to VII/550.

The preparation of the polymers stated for c3) is known to the person skilled in the art.

The incompatibility or partial compatibility of the polymers c3) with the molding materials consisting of A) and B) results in the polymers c3) forming in the molding material agglomerates which have a relatively large diameter and act as dulling agents, in particular in the manner described.

Examples of the preferred embodiment c4) are the alkyl acrylate graft polymers having a large diameter ($d_{50}$>700 nm), as mentioned as dulling agents in the description of the component B). The type and amount of the monomers which are used for the preparation of the small-particled component B) ($d_{50}$<700 nm) on the one hand and of the polymers c4) on the other hand may be identical or different. In a preferred embodiment, the graft polymers c4) have an average particle diameter $d_{50}$ of 3 $\mu$m or more, and in a particularly preferred embodiment the $d_{50}$ is 4 $\mu$m or more.

The grafted acrylate rubber particles c4) are prepared, as a rule, in emulsion, in suspension or in solution in the manner to a person skilled in the art.

The particulate polymer C) may consist of one of the stated embodiments c1) to c4) alone or of a mixture of a plurality of these embodiments.

Particularly preferred polymers C) are those which have good resistance to weather effects and which, in combination with the components A) and B), which are likewise stable to UV light, give molding materials from which novel shaped articles having good weather resistance can be produced. Polymers C) which are free of butadiene or other conjugated dienes are therefore particularly preferred.

Also particularly preferred are polymers C) which have elastomeric properties. Consequently, the good mechanical properties of the shaped articles, in particular the toughness, are not substantially changed or are even improved.

In particular, some of the graft polymer B) may be replaced by the embodiments c4)—graft polymer according to the definition of B) but having a $d_{50}$ value greater than 700 nm.

In addition to the components A), B) and C), the thermoplastic molding materials from which the novel shaped articles are produced may also contain additives, such as lubricants and mold release agents, waxes, pigments, dyes, flameproofing agents, anti-oxidants, light stabilizers, fibrous and pulverulent fillers and reinforcing agents and antistatic agents in the amounts usual for these agents.

The preparation of the molding materials may be carried out by mixing methods known per se, for example by incorporating the graft polymer B) and the particulate polymer C) into the thermo-plastic polymer A) at above the melting point of A), in particular at from 150° to 350° C., in an extruder, Banbury mixer, kneader, roll mill or calender. However, the components may also be mixed at room temperature without melting, and the mixture in the form of a powder or consisting of granules is melted and homogenized only during processing.

The molding materials are processed by the generally conventional methods to give the novel shaped articles. Extrusion (for pipes, profiles, fibers, films and sheets), injection molding (for shaped articles of all kinds, in particular those having complicated geometry), calendering and rolling (for sheets and films) may be mentioned by way of example.

The dull shaped articles produced from the molding materials described are particularly suitable for use in exterior applications, especially in automotive construction.

Examples of such exterior automotive parts are exterior mirrors, light surrounds, radiator grills, hub caps, bumpers, rear panels, protective strips, spoilers, door handles and similar components.

The novel shaped articles have a uniformly dull surface, goods weather resistance and good impact strength.

EXAMPLES

The stated average particle size d is the weight average of the particle size as determined by means of an analytical ultracentrifuge according to the method of W. Scholtan and H. Lange, Kolloid-Z. und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size.

The $d_{10}$ value indicates the particle diameter at which 10% by weight of all particles have a smaller diameter and 90% by weight have a larger diameter. Conversely, it is true for the $d_{90}$ value that 90% by weight of all particles have a smaller diameter, and 10% by weight a larger diameter, than the diameter which corresponds to the $d_{90}$ value. The weight-average particle diameter $d_{50}$ or volume-average particle diameter $D_{50}$ indicates the particle diameter at which 50% by weight or % by volume of all particles have a larger particle diameter and 50% by weight or % by volume have a smaller particle diameter. The $d_{10}$, $d_{50}$ and $d_{90}$ values characterize the width Q of the particle size distribution, where $Q=(d_{90}-d_{10})/d_{50}$. The smaller Q, the narrower the distribution.

The following components were prepared (all stated % are by weight).

Preparation of a component A): Copolymer of styrene and acrylonitrile

A copolymer of 65% by weight of styrene and 35% by weight of acrylonitrile were prepared by the continuous solution polymerization method, as described in Kunststoff-Handbuch, editors R. Vieweg and G. Daumiller, Vol. V Polystyrol, Carl-Hanser-Verlag Munich 1969, pages 122 to 124. The viscosity number VN (determined according to DIN 53 726 at 25° C. in a 0.5% strength by weight solution in dimethylformamide) was 80 ml/g.

Preparation of a component B): Particulate graft polymer of crosslinked poly-n-butyl acrylate (core)/styrene-acrylonitrile copolymer (shell)

For the preparation of a seed latex, 16 g of butyl acrylate and 0.4 g of tricyclodecenyl acrylate in 150 g of water were heated to 60° C. while stirring with the addition of 1 g of sodium salt of a $C_{12}$—$C_{18}$-paraffinsulfonic acid, 0.3 g of potassium persulfate, 0.3 g of sodium bicarbonate and 0.15 g of sodium phosphate. 10 minutes after initiation of the polymerization reaction, a mixture of 82 g of butyl acrylate and 1.6 g of tricyclodecenyl acrylate were added in the course of 3 hours. After the end of the monomer addition, the reaction was allowed to continue for a further hour. The latex obtained had a solids content of 40% and an average particle size $d_{50}$ of 76 nm. The particle size distribution was narrow (quotient Q=0.29).

A mixture of 98 g n-butyl acrylate and 2 g of dihydrodicyclopentadienyl acrylate and, separately therefrom, a solution of 1 g of sodium $C_{12}$—$C_{18}$-paraffinsulfonate in 50 g of water were added to a mixture of 3 g of the resulting seed latex, 100 g of water and 0.2 g of potassium persulfate in the course of 4 hours at 60° C. The polymerization was then continued for a further 2 hours. The average particle diameter $d_{50}$ of the resulting latex was 430 nm and the particle size distribution was narrow (Q=0.1).

150 g of this latex were mixed with 60 g of water, 0.03 g of potassium persulfate and 0.05 g of lauryl peroxide, after which first, in the course of 3 hours at 65° C., 20 g of styrene and then, in the course of a further 4 hours, a mixture of 15 g of styrene and 5 g of acrylonitrile were grafted onto the latex particles. Thereafter, the polymer was precipitated with a calcium chloride solution at 95° C., isolated, washed with water and dried in a warm air stream. The degree of grafting of the polymer was 35% and the particles had an average diameter $d_{50}$ of 510 nm.

The component B) is accordingly a conventional ASA polymer.

Preparation of a component C):

C-I: Particulate graft polymer of polybutadiene (core)/styrene-acrylonitrile copolymer (shell), prepared in solution—ie. solution ABS Polybutadiene rubber was dissolved in a mixture of monomeric styrene and monomeric acrylonitrile and the mixture was polymerized. The specific procedure was as described in Example 14 of U.S. Pat. No. 4,362,850 (columns 11 and 12).

The volume-average diameter $D_{50}$ of the resulting solution ABS particles was 4.3 μm, as determined by measuring electronmicrographs prepared using thin sections.

C-II: Rubber comprising butadiene-acrylonitrile polymer

A copolymer of butadiene and acrylonitrile, having an acrylonitrile content of 29%, was used. The Mooney viscosity (determined at 100° C. according to ASTM D 1646-81) of this rubber was 50.

C-III: Copolymer of n-butyl acrylate, acrylonitrile, styrene and acrylic acid

A monomer mixture comprising 2% by weight of acrylic acid, 14% by weight of styrene, 54% by weight of n-butyl acrylate and 30% by weight of acrylonitrile was polymerized in aqueous solution by the dispersion polymerization method.

The solids content of the dispersion, which was further processed as such, was 48% by weight. The polymer was homogeneous (no shell structure).

C-IV: Particulate graft polymer of poly-n-butyl acrylate (core) and styrene/acrylonitrile copolymer (shell)

| | |
|---|---|
| 1230 g | of water |
| 8.6 g | of $Na_2HPO_4.12\ H_2O$ ⎫ as buffer system |
| 3.2 g | of $NaH_2PO_4.12\ H_2O$ ⎭ |
| 1.6 g | of dilauroyl peroxid as initiator |
| 100 g | of polyvinyl alcohol solution (10% by weight in water, degree of hydrolysis 88%, average molecular weight about 127,000) as a protective colloid |
| 600 g | of n-butyl acrylate as core monomer and |
| 9.0 g | of dihydrodicyclopentadienyl acrylate as crosslinking agent | were combined in the stated order under nitrogen and stirred with a high-speed stirrer (dissolver stirrer, 3500 rpm, 5 cm toothed disk) for 40 minutes. At the same time, the mixture was gradually heated to 73° C. This resulted in the formation of monomer droplets of average diameter 10 μm, as determined microscopically with a sample.

This dispersion was transferred to another kettle and heated to 87° C. there with moderate stirring for 2 hours, the core polymer being formed (conversion about 95%).

A mixture of

| | | |
|---|---|---|
| 280 g | of styrene | as shell monomer |
| 120 g | acrylnitrile | |
| 0.5 g | of tert-butyl perpivalate as initiator and | |
| 0.5 g | of 2-ethylhexylthioglycolate as molecular weight regulator | | was then added to the mixture with moderate stirring at 70° C. in the course of 10 minutes, and the mixture was then kept for 2 hours at 70° C. and then heated to 85° C. in the course of 2 hours.

The particles of the resulting graft polymer (type comprising 60% by weight of n-butyl acrylate, 28% by weight of styrene and 12% by weight of acrylonitrile, crosslinked) had an average particle diameter $D_{50}$ of 10 μm, a diameter $D_{10}$ of 4 μm and a diameter $D_{90}$ of 25 μm.

The dispersion obtained was incorporated as such into the polymer, as described below. The polymers C-I to C-IV may be assigned to the embodiments c1) to c4) of the component C) as follows:

| | |
|---|---|
| C-I | →c1) |
| C-II | →c3) |
| C-III | →c3) |
| C-IV | →c4) |

Preparation of the blends and of the moldings:

The components A), B) and C) were thoroughly mixed in a conventional extruder of type ZSK 30 from Werner and Pfleiderer at 260° C., extruded and granulated.

In the case of the components C-III and C-IV, the components A) and B) were first mixed and melted in the stated extruder, after which the dispersion of C-III or C-IV was introduced continuously into the melt. The water was removed by dewatering apparatuses along the extruder.

The granules were injection molded at a melt temperature of 220° C. and a mold temperature of 60° C. to give standard small bars (cf. DIN 53 453). Furthermore, circular disks of 6 cm diameter and 0.2 cm thickness were injected molded at a melt temperature of 250° C. and a mold temperature of 60° C.

Investigation of the moldings:

The impact strength test for determining the impact strength was carried out on standard small bars according to DIN 53 453.

In order to determined the surface gloss, the light reflection from the circular disks was measured similarly to DIN 67 530, using a photometer and at an angle of 45°. Circular disks which have a light reflection of less than 25% under the stated conditions are defined as dull.

In order to determine the weather resistance, standard small bars were exposed for 250, 500 and 1000 hours in a Xenotest 1200 CPS UV exposure unit according to DIN 53 387 and the impact strength test according to DIN 53 453 was then carried out, impact being effected on the unexposed side.

Standard small bars which are to be defined as having good weather resistance are those which have values of less than $a_n$=50 kJ/m$^2$ under the stated conditions only after exposure for more than 250 hours.

The mixing ratios in the polymer blends and the properties of the moldings produced from them are shown in the table below.

TABLE

| Example | 1 V | 1 | 2 | 3 | 4 |
|---|---|---|---|---|---|
| Composition [% by weight]: | | | | | |
| A | 50 | 50 | 50 | 50 | 50 |
| B | 50 | 25 | 45 | 40 | 40 |
| C | — | 25 C-I | 5 C-II | 10 C-III | 10 C-IV |
| Properties: | | | | | |
| Light reflection [%] | 87 | 19 | 17 | 16 | 14 |
| Impact strength $a_n$ (25° C.) before exposure | n.f. | n.f. | n.f. | n.f. | n.f. |
| after exposure for 250 h | n.f. | 61 | n.f. | n.f. | n.f. |
| after exposure for 500 h | n.f. | *) | 54 | n.f. | n.f. |
| after exposure for 1000 h [kJ/m$^2$] | 80-n.f. | *) | *) | 80-n.f. | 80-n.f. | n.f. = not fractured
*) = not determined

Comparative Example IV shows the shaped articles comprising molding materials which contain an SAN polymer A) and a conventional ASA graft polymer B) have high impact strength—the moldings do not fracture—and good weather resistance—no decline in the impact strength after exposure to UV light—but possess high surface gloss.

In contrast, shaped articles with molding materials contain large particles of solution ABS (C-I) in addition to the SAN polymer A) and the conventional ASA graft polymer B) combine high impact strength, good weather resistance and low surface gloss (good dullness), as Example 1 shows.

When a small amount of a butadiene/acrylonitrile rubber C-II is present in addition to the SAN polymer A) and the conventional ASA graft polymer B) (Example 2), the shaped articles have a dull surface and are impact-resistant and have good weather resistance.

If a copolymer of butyl acrylate, acrylonitrile, styrene and acrylic acid C-III is present in small amounts, the weather resistance is further improved while the surface gloss is comparably low (Example 3).

Shaped articles which contain small amounts of a large-particled acrylate rubber graft polymer C-IV have even lower surface gloss in conjunction with very good weather resistance (Example 4).

We claim:

1. A shaped article produced from a thermoplastic molding material which contains
   A) from 30 to 99.8% by weight of a thermoplastic polymer of
      a1) a monomer unit of from 50 to 100% by weight of a styrene compound of the formula

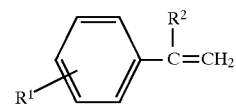

where $R^1$ and $R^2$ are each hydrogen or $C_1$–$C_8$-alkyl, or of a $C_1$–$C_8$-alkyl ester of acrylic acid or methacrylic acid, or a mixture thereof,
      a2) a monomer unit of from 0 to 40% by weight of or methacrylonitrile, or a mixture thereof, and
      a3) from 0 to 40% by weight of one or more further monoethylenically unsaturated monomers which differ from a2),
   B) from 0.1 to 70% by weight of a graft polymer having an average particle diameter $d_{50}$ of less than 700 nm and comprising b1) from 30 to 90% by weight of an elastomeric graft core comprising a polymer having a glass transition temperature below 0° C., prepared by copolymerization of
  b11) from 50 to 99.9% by weight of a $C_1$–$C_{10}$-alkyl ester of acrylic acid,
  b12) from 0.1 to 5% by weight of a polyfunctional, crosslinking monomer, and
  b13) from 0 to 40% by weight of one or more further monoethylenically unsaturated monomers which differ from b11), and
b2) from 10 to 70% by weight of a graft shell comprising
  b21) from 50 to 100% by weight of a styrene compound of the formula

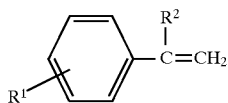

where $R^1$ and $R^2$ are each hydrogen or $C_1$–$C_8$-alkyl, or of a $C_1$–$C_8$-alkyl ester of acrylic acid or methacrylic acid, or a mixture thereof,
  b22) from 0 to 40% by weight of acrylonitrile or methacrylonitrile, or a mixture thereof, and
  b23) from 0 to 40% by weight of one or more further monoethylenically unsaturated monomers and
C) from 0.1 to 70% by weight of a particulate polymer as
a C) from 0.1 to 70% by weight of a particulate polymer as a dulling agent, the particulate polymer C) consisting essentially of
  c1) an elastomeric graft polymer having an average particle diameter $d_{50}$ of 1000 nm or more, which contains a graft core of butadiene and a graft shell of styrene and acrylonitrile and is prepared by the solution polymerization method, or
  c2) a hard polymer based on crosslinked polyalkyl methacrylates, or
  c31) hydrogenated or non-hydrogenated rubbers comprising polymerized butadiene and acrylonitrile, or
  c32) copolymers of $C_2$–$C_{20}$-alkyl esters of acrylic acid or methacrylic acid, or
  c33) copolymers of acrylonitrile or methacrylonitrile, or
  c34) copolymers of styrene or copolymers of substituted styrenes, or
  c35) copolymers of acrylic acid or methacrylic acid, or maleic anhydride or its maleates or maleimides,
  or mixtures thereof, all polymers c31) to c35) having no core/shell-structure and being incompatible or partially compatible with mixtures which contain the components A) and B) defined above, or
  c4) a graft polymer as defined under B), but having an average particle diameter $d_{50}$ of 3 µm or more.

2. A shaped article produced from a thermoplastic molding material as claimed in claim 1, in which the particulate polymer C) is a graft polymer comprising a core of polybutyl acrylate and a shell of a styrene-acrylonitrile copolymer, the average particle diameter $d_{50}$ being 3 µm or greater.

3. A shaped article produced from a thermoplastic molding material as claimed in claim 1, in which the particulate polymer C) is a graft polymer prepared by the solution polymerization method and comprising a core of polybutadiene and a shell of a styrene-acrylonitrile copolymer, the average particle diameter $d_{50}$ being 700 nm or greater.

4. A shaped article produced from a thermoplastic molding material as claimed in claim 1, in which the particulate polymer C) is a hard polymer based on polyalkyl methacrylates.

5. A shaped article produced from a thermoplastic molding material as claimed in claim 1, in which the particulate polymer C) is
  c31) a hydrogenated or non-hydrogenated rubber comprising polymerized butadiene and acrylonitrile, or
  c32) a copolymer of $C_2$–$C_{20}$-alkyl esters of acrylic acid or methacrylic acid, or
  c33) a copolymer of acrylonitrile or methacrylonitrile, or
  c34) a copolymer of styrene or copolymers of substituted styrene, or
  c35) a copolymer of acrylic acid or methacrylic acid, or maleic anhydride or its maleates or maleimides,
  or mixtures thereof, all polymers c31) to c35) having no core/shell-structure and being incompatible or partially compatible with mixtures which contain the components A) and B) defined above.

6. A shaped article produced from a thermoplastic molding material as claimed in claim 1, in which the particulate polymer C) is a graft polymer as defined under B), but the average particle diameter $d_{50}$ is 3 µm or more.

7. A process for the production of a molding for the exterior of motor vehicles using a thermoplastic molding material as claimed in claim 1.

* * * * *